United States Patent
Levy et al.

(10) Patent No.: US 10,778,610 B2
(45) Date of Patent: Sep. 15, 2020

(54) DEDUPLICATION OF MIRROR TRAFFIC IN ANALYZER AGGREGATION NETWORK

(71) Applicant: Mellanox Technologies TLV Ltd., Raanana (IL)

(72) Inventors: Gil Levy, Hod Hasharon (IL); Liron Mula, Ramat Gan (IL); Aviv Kfir, Nili (IL)

(73) Assignee: MELLANOX TECHNOLOGIES TLV LTD., Raanana (IL)

( * ) Notice: Subject to any disclaimer, the term of this patent is extended or adjusted under 35 U.S.C. 154(b) by 0 days.

(21) Appl. No.: 16/181,395

(22) Filed: Nov. 6, 2018

(65) Prior Publication Data
US 2020/0145315 A1    May 7, 2020

(51) Int. Cl.
| H04L 12/931 | (2013.01) |
| H04L 12/26 | (2006.01) |
| H04L 12/707 | (2013.01) |
| H04L 29/08 | (2006.01) |

(52) U.S. Cl.
CPC ............ *H04L 49/208* (2013.01); *H04L 43/50* (2013.01); *H04L 45/24* (2013.01); *H04L 69/324* (2013.01)

(58) Field of Classification Search
CPC . H04L 43/50; H04L 49/208; H04W 24/06–10
See application file for complete search history.

(56) References Cited

U.S. PATENT DOCUMENTS

| | | | | |
|---|---|---|---|---|
| 8,213,313 | B1* | 7/2012 | Doiron | H04L 43/028 370/235 |
| 10,404,591 | B2* | 9/2019 | Ma | H04L 61/2596 |
| 2011/0299532 | A1* | 12/2011 | Yu | H04L 12/4625 370/392 |
| 2013/0191628 | A1* | 7/2013 | Nedeltchev | H04L 63/0272 713/153 |
| 2016/0087916 | A1* | 3/2016 | Janardhanan | H04L 63/1408 370/390 |
| 2016/0226725 | A1* | 8/2016 | Iizuka | H04L 43/022 |
| 2016/0352801 | A1* | 12/2016 | Krishna | H04L 65/80 |
| 2017/0034078 | A1* | 2/2017 | Nguyen | H04L 63/1408 |
| 2017/0223104 | A1* | 8/2017 | Keesara | H04L 43/14 |
| 2017/0237632 | A1* | 8/2017 | Hegde | H04L 43/028 370/252 |
| 2018/0248778 | A1* | 8/2018 | Vinsel | H04L 43/12 |
| 2019/0132260 | A1* | 5/2019 | Suzuki | G06F 9/45533 |
| 2019/0199609 | A1* | 6/2019 | Hammerle | H04L 41/14 |
| 2019/0273717 | A1* | 9/2019 | Dearien | H04L 63/0209 |

* cited by examiner

*Primary Examiner* — Marcus Smith
(74) *Attorney, Agent, or Firm* — Kligler & Associates Patent Attorneys Ltd (57) ABSTRACT

A network switch includes multiple ports that serve as ingress ports and egress ports for connecting to a communication network, and processing circuitry. The processing circuitry is configured to receive packets via the ingress ports, select one or more of the packets for mirroring, create mirror copies of the selected packets and output the mirror copies for analysis, mark the packets for which mirror copies have been created with mirror-duplicate indications, and forward the packets to the egress ports, including the packets that are marked with the mirror-duplicate indications.

8 Claims, 6 Drawing Sheets

DEDUPLICATION OF MIRROR TRAFFIC IN ANALYZER AGGREGATION NETWORK

FIELD OF THE INVENTION

The present invention relates generally to communication networks, and particularly to handling of mirrored packets in communication networks.

BACKGROUND OF THE INVENTION

Packet Mirroring is widely used in communication networks, and may be used for monitoring and for other purposes. In some cases, multiple copies of the same packet may be generated.

SUMMARY OF THE INVENTION

An embodiment of the present invention that is described herein provides a network switch, including multiple ports and processing circuitry. The multiple ports serve as ingress ports and egress ports for connecting to a communication network. The processing circuitry is configured to receive packets via the ingress ports, select one or more of the packets for mirroring, create mirror copies of the selected packets and output the mirror copies for analysis, mark the packets for which mirror copies have been created with mirror-duplicate indications; and forward the packets to the egress ports, including the packets that are marked with the mirror-duplicate indications.

In an embodiment, the processing circuitry is configured to mark the packets by setting a predefined bit in headers of the packets.

There is additionally provided, in accordance with an embodiment of the present invention, an apparatus, including one or more ports for receiving from a communication network mirror copies of packets for analysis wherein the mirror copies have respective mirror-duplication indication fields, an output interface and processing circuitry. The output interface is configured for connecting to an analyzer that utilizes only a single mirror copy of a packet. The processing circuitry is configured to forward the mirror copies to the analyzer while dropping the packets whose mirror-duplication indication fields indicate a duplicate packet.

In an embodiment the output interface is further configured for connecting to an additional analyzer that utilizes all mirror copies of the packet, and the processing circuitry is configured to forward the mirror copies to the additional analyzer regardless of whether the mirror-duplication indication fields indicate a duplicate packet.

There is also provided, in accordance with an embodiment of the present invention, a method including, in a network switch that includes multiple ports serving as ingress ports and egress ports for connecting to a communication network, receiving packets via the ingress ports. One or more of the packets are selected for mirroring. Mirror copies of the selected packets are created, and the mirror copies are output for analysis. The packets for which mirror copies have been created, are marked with mirror-duplicate indications. The packets, including the packets that are marked with the mirror-duplicate indications, are forwarded to the egress ports.

There is additionally provided, in accordance with an embodiment of the present invention, a method including receiving from a communication network mirror copies of packets for analysis. The mirror copies have respective mirror-duplication indication fields. The mirror copies are forwarded to an analyzer, which utilizes only a single mirror copy of a packet, while dropping the packets whose mirror-duplication indication fields indicate a duplicate packet.

The present invention will be more fully understood from the following detailed description of the embodiments thereof, taken together with the drawings in which:

DETAILED DESCRIPTION OF EMBODIMENTS

Overview

According to embodiments of the present invention, packet mirroring is used to enable monitoring traffic, e.g., for network management, security, debug and statistic collection. In an embodiment, when a network switch mirrors a packet, it outputs two copies of the packet via two ports—the original packet and the mirror packet (which differs from the original packet by one or more packet header fields).

In some embodiments, a network may comprise a plurality of mirroring agents (sometime referred to as analyzers, or analyzer tools), wherein each agent is responsible for a specific analysis task. An analyzer tool may, for example, analyze congestion in the network; another analyzer tool may, for another example, track data for security monitoring, and so on.

In embodiments of the present invention, the network comprises an analyzer network, which is used for probing, analysis and debug, and a functional network (referred to hereunder as Production Network), which comprises the various sources and destinations, but does not comprise the analysis network. Packets which transverse the production network only will be referred to hereunder as Production Packets (production packets, per definition, do not include mirror packets).

In some embodiments of the present invention, a production network sends the mirror traffic to an analyzer network (in some cases the production network sends all traffic, whereas in other cases the production network sends sampled traffic). The analyzer network is an aggregation network of all the mirror traffic. It is responsible for redirecting the mirrored traffic to specific mirror agents. Each mirror packet can be forwarded to one analyzer tool.

In practice, a packet traversing the production network may potentially be mirrored by multiple network elements, e.g., switches and/or routers. In some cases, however, some of the mirror agents require receiving only a single copy of a packet, whereas other agents may require all the generated copies of the same packet. For example, a mirror agent that tracks the different flows in the network usually requires a single mirror copy of each packet, whereas a mirror agent that is monitoring the flows' paths will usually need all the mirror copies generated by all network switch elements of the production network. Mirror agents that need a single copy of mirror packets will be referred to hereunder as Mirror Agents Requiring Single Copy (MARSC). Mirror agents that need all copies of the mirror packets will be referred to as Mirror Agents Requiring All Copies (MARAC).

As can be appreciated, sending multiple mirror copies to a mirror agent (e.g., a server) that requires only a single copy may overload the mirror agent, which may allocate substantial resources to de-duplicate (i.e., remove duplicate copies of) the received packets. This complexity reduces the efficiency of the MARSCs and may result in allocating an increased number of servers, and/or reduced analysis bandwidth (i.e. some packets may be dropped).

In embodiments, a network switch that generates a mirror copy of a production packet marks the production packet that it outputs as a duplicate packet, to indicate to the analyzer network that the network switch also sends a mirror packet (typically on a different port). The duplicate marking can be done, for example, using a bit in the packet header.

Network switches that do not generate mirror copies of a packet, transfer packets without changing their duplicate marking. Thus, for a given production packet there will be only a single non-duplicate-marked mirror packet in the network.

According to embodiments of the present invention, MARSCs monitor only non-duplicate-marked packets, whereas MARACs monitor packet regardless of their duplicate marking. In an embodiment, a packet broker in the monitoring network checks the duplicate-marking of ingress packets and drops the duplicate-marked packets that are directed to MARSCs.

Thus, in embodiments according to the present invention, monitoring tools that need only one copy of mirrored packets may have higher bandwidth and/or require fewer servers.

System Description

Figure 1:
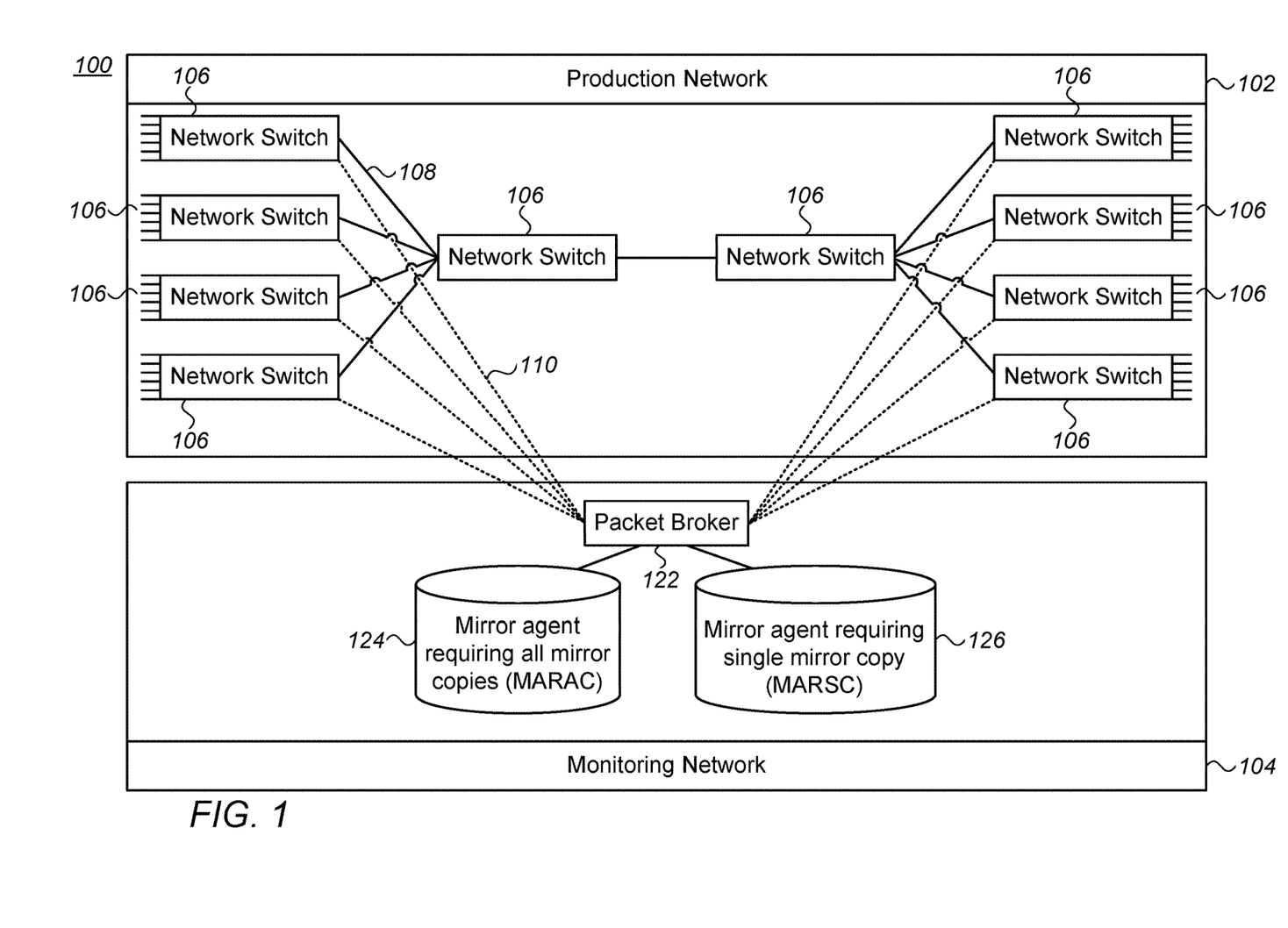
FIG. 1 is a block diagram that schematically illustrates a production network coupled to a monitoring network, in accordance with embodiments of the present invention.

FIG. 1 is a block diagram that schematically illustrates a network 100, comprising a production network 102, and a monitoring network 104 that is coupled to the production network, in accordance with embodiments of the present invention. Production network 102 comprises network switches 106, which receive and send production packets 108 and mirror packets 110.

According to an embodiment, monitoring network 104 comprises a packet broker 122 (typically comprising a network switch or an aggregation of network switches), and two types of analyzer tools—an MARSC analyzer tool 124, and an MARSC analyzer tool 126. When mirror duplicate indication is not enabled, the packet broker forwards all mirror packets to both analyzer tools 124 and 126. Analyzer tool 126 will then filter-off duplicate mirror packets.

As would be appreciated, network 100, production network 102 and monitoring network 104 described above are cited by way of example. Networks in accordance to the disclosed techniques are not limited to the description hereinabove. In alternative embodiments, for example, packet broker 122 may be integrated in a monitoring agent; the monitoring network may comprise a single network switch, or may be embedded, in part or whole, in the production network.

Figure 2:
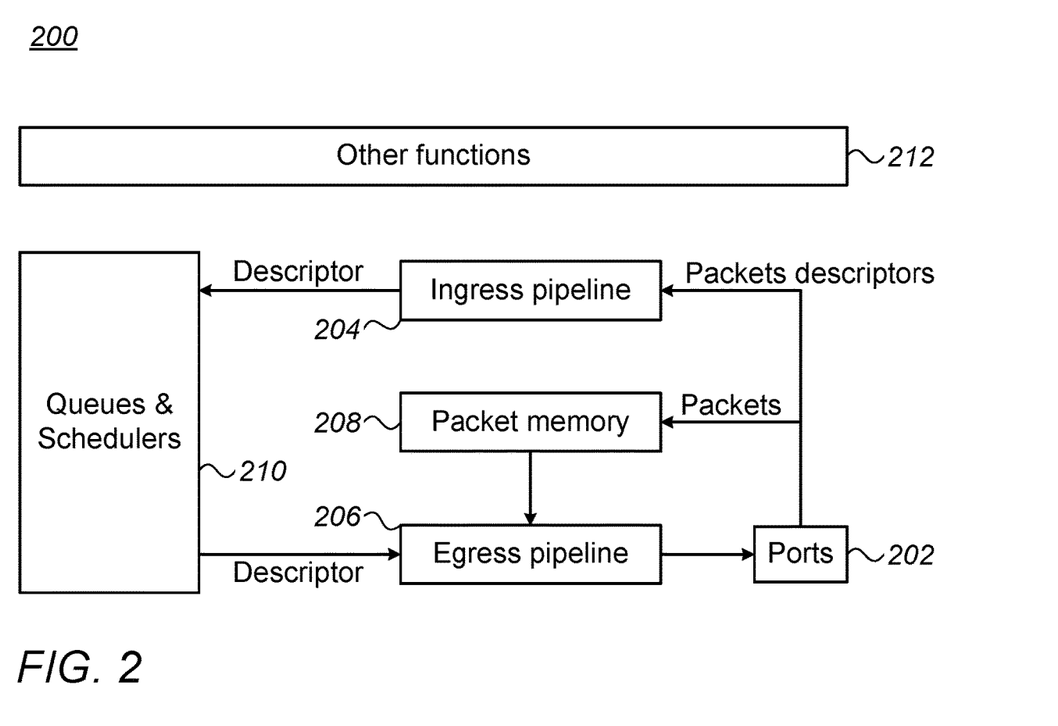
FIG. 2 is a block diagram that schematically illustrates the structure of a network switch, in accordance with an embodiment of the present invention.

FIG. 2 is a block diagram that schematically illustrates the structure of a network switch 200, in accordance with an embodiment of the present invention. Network switch 200 comprises a Ports unit 202, an Ingress Pipeline 204, an Egress Pipeline 206, a Packet Memory 208, a Queues & Schedulers unit 210, and Other Functions 212. Other Functions 212 is an aggregation of all network switch functions which do not pertain to embodiments of the present invention; and will not be described below.

According to an embodiment, the network switch routes packets that it receives on Ports Unit 202 to packet memory 208, and descriptors of the packets to Ingress Pipeline 204. The Ingress Pipeline processes the packets and sends descriptors of packets to Queues & Schedulers unit 210. According to embodiments of the present invention, if packet duplicate-marking is enabled, and if the packet is mirrored, the ingress pipeline signals (using, for example, a bit in the descriptor), that the output packet must be marked as duplicate (it should be noted that the packet may already be marked).

Queues & Schedulers unit 210 sends descriptors of the packets to be output to Egress pipeline 206, which processes packets, duplicate-marks them if necessary (i.e. if an original packet is duplicate-marked, or if the Ingress pipeline indicates that the packet is to be duplicate-marked), and sends the packets to ports unit 202, which then outputs the packets to the network.

In a Monitoring network, when a network switch 200 is configured as a packet broker 112 (FIG. 1), Ingress Pipeline 204 forwards all packets that are directed to MARSC 124, irrespective of the packets' duplicate marking, and drops packets that are directed to MARSC 126 if the packets are duplicate-marked.

Thus, according to embodiments of the present invention, when packet duplicate-marking is enabled, network switches of the production network will duplicate-mark all duplicate packets (i.e. all multiply-mirrored packets except for the first mirror packet); the packet broker will forward all monitored packets to MARACs, and only the non-duplicate mirror packets to MARSCs, enabling faster and less costly mirror-agents.

As would be appreciated, the structure of switch 200 is cited by way of example. Network switches in accordance to the disclosed techniques are not limited to the description hereinabove. In alternative embodiments, for example, there may not be ingress and/or egress pipelines; duplicate-marking may be done directly on the packet (rather than signaled in the descriptor). In the present context, the elements of switch 200 other than ports 202 are referred to collectively as "processing circuitry."

Figure 3A:
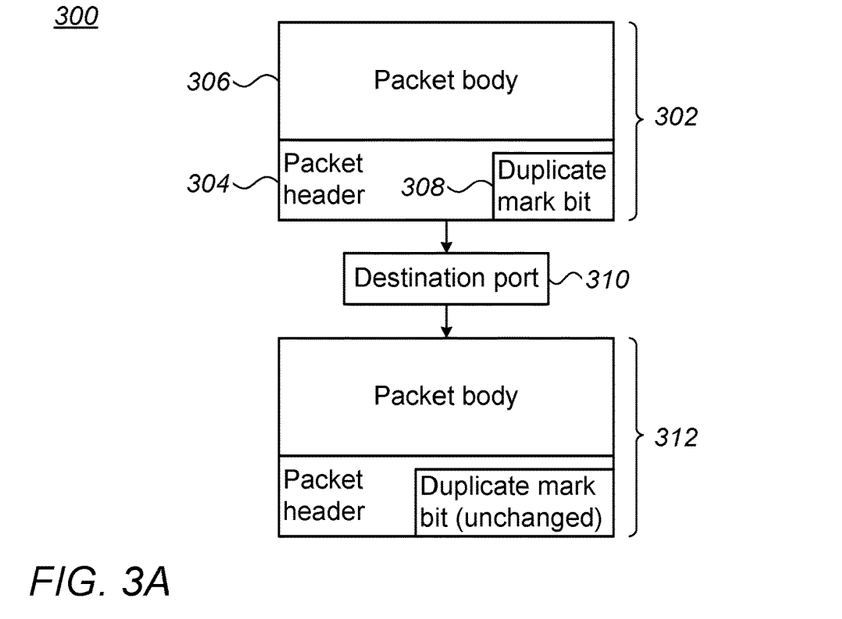
FIG. 3A is a block diagram that schematically illustrates handling of a duplicate-marked packet by a network switch, in accordance with an embodiment of the present invention.

FIG. 3A is a block diagram 300 that schematically illustrates handling of a duplicate-marked packet by a communication network switch, in accordance with an embodiment of the present invention. Packet 302 comprises a packet header 304 and a packet body 306. The packet header comprises a duplicate-mark-bit 308.

According to an embodiment, a packet that enters the network switch is forwarded to a destination port 310, which then outputs an egress packet 312. In embodiments, the output packet has an identical packet body, and identical duplicate-mark bit as ingress packet 302. Thus, whenever a packet is duplicate-marked, it will remain duplicate-marked until it reaches its destination.

Figure 3B:
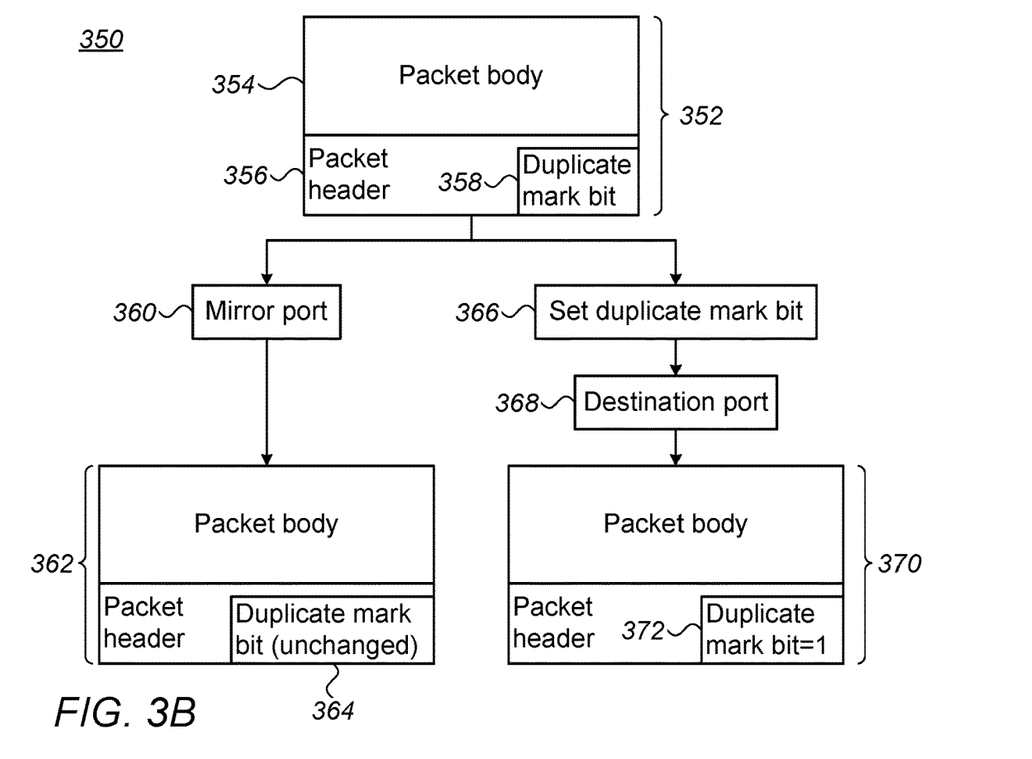
FIG. 3B is a block diagram that schematically illustrates mirroring of a packet, in accordance with an embodiment of the present invention.

FIG. 3B is a block diagram 350 that schematically illustrates mirroring of a packet, in accordance with an embodiment of the present invention. An ingress packet 352 comprises a packet body 354 and a packet header 356. The packet header comprises a duplicate-bit 358. According to an embodiment, a set duplicate-mark bit in the header of an egress packet indicates that the packet is a duplicate mirror packet (i.e. it has already been mirrored).

A mirror packet 362 is generated at a mirror port 360. The body of the mirror packet is identical to the body 354 of ingress packet 352. The mirror packet header comprises a duplicate-mark bit 364, and its value is identical to the value of duplicate-mark bit 358 in the ingress packet.

According to the example embodiment of FIG. 3B, since the network switch generates a mirror packet, the network switch should set the duplicate-mark bit of the packet. This is done in a set-duplicate-mark-bit logic 366, which sets the duplicate-mark bit of the packet and sends it to a destination port 368. The destination port then outputs an egress packet 370, comprising a packet body that is identical to packet body 354 of the ingress packet, and a set duplicate-mark-bit 372.

Figure 4:
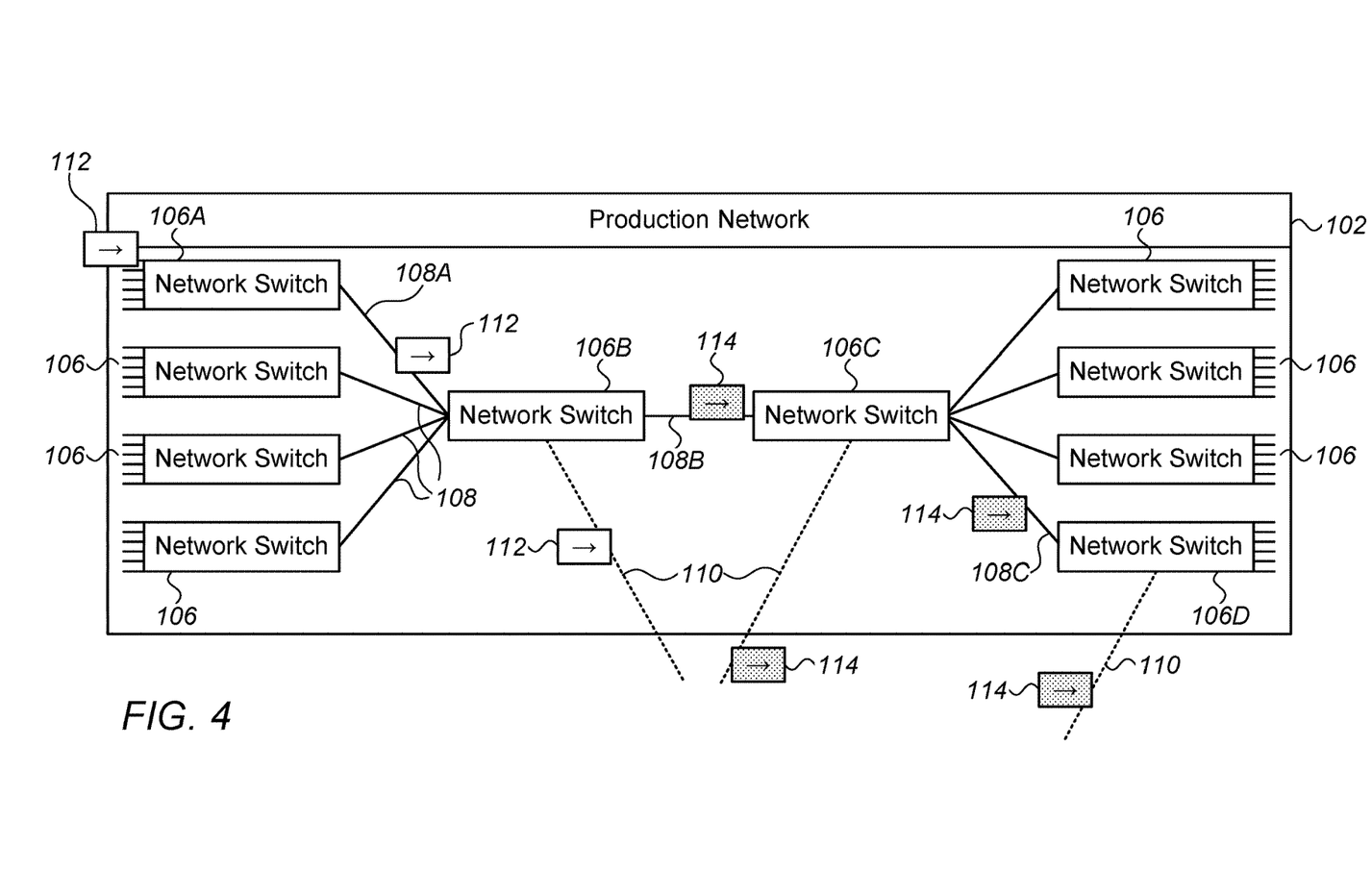
FIG. 4 is a block diagram that schematically illustrates the flow of packets in a production network, with packet duplicate marking enabled.

FIG. 4 is a block diagram that schematically illustrates the flow of packets in production network 102 (FIG. 1), with packet duplicate-marking enabled, according to an embodiment of the present invention. In the example embodiment of FIG. 4, mirror packet duplicate-marking is enabled; boxes 112 indicate if a packet is duplicate-marked (box 112 is grey) or not-duplicate-marked (box 112 is white). The production network comprises network switches 106, production packets 108 and mirror packets 110 (all of which were described with reference to FIG. 1).

In the example embodiment of FIG. 4, production network 102 is configured to mirror a packet that enters the network at a network switch 106A (top-left input of the network switch). The packet propagates through network switch 106A, a network switch 106B, a network switch 106C and a network switch 106D, and is designated 108A, 108B, 108C and 108D in the segments between the network switches. Network switches 106B, 106C and 106D generate mirror copies of the packet, designated 110.

According to the example embodiment of FIG. 4, the packet to be mirrored enters the production network at network switch 106A, with no duplicate marking. As network switch 106A does not generate a mirror packet, the packet's duplicate mark will remain off at 108A. Network switch 106B generates a mirror packet, and, hence, the packet at 108B will be duplicate-marked. The packet will remain duplicate-marked at 108C and 108D.

Thus, the copy of mirror packet 110 that network switch 106B generates will not be duplicate-marked, indicating that it is the first copy of the mirror packet. All other copies will be duplicate-marked.

As would be appreciated, production network 102 described above is cited by way of example. Networks in accordance to the disclosed techniques are not limited to the description hereinabove. In alternative embodiments, there could be any number of network switches, including a single network switch; some or all the network switches may have multiple ports; and, a plurality of packets may be mirrored.

According to embodiments of the present invention, packet broker 122 is implemented using a switch, for example, the switch depicted in FIG. 2 (in some embodiments, a packet broker may be an aggregation of two or more switches, which are configured as a single switch with higher performance). A packet broker is further configured to route mirror packets in an analysis network, as will be described herein with reference to FIGS. 5A, 5B and 5C.

Figure 5A:
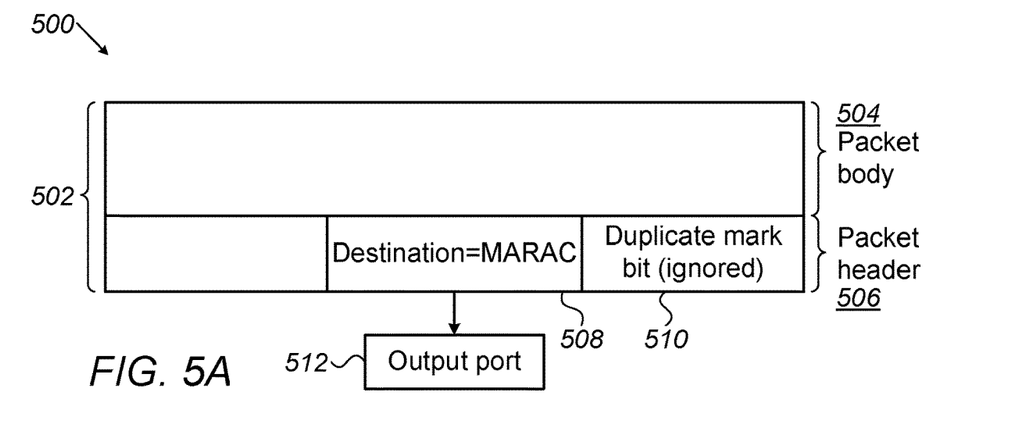
FIG. 5A is a block diagram that schematically illustrates the forwarding of a mirror packet to mirror agent that requires all mirror copies by a packet broker, in accordance with an embodiment of the present invention.

FIG. 5A is a block diagram 540 that schematically illustrates the forwarding of a mirror packet to a MARSC by a packet broker, in accordance with an embodiment of the present invention. An incoming packet 502 comprises a packet body 504 and a packet header 506. The packet header comprises a destination field 508 and a duplicate-mark-bit 508. As illustrated in the example embodiment of FIG. 5A, if the destination field 508 indicates a MARSC, the switch will output the packet through an output port 512, irrespective of the status of a duplicate-mark-bit 510.

Figure 5B:
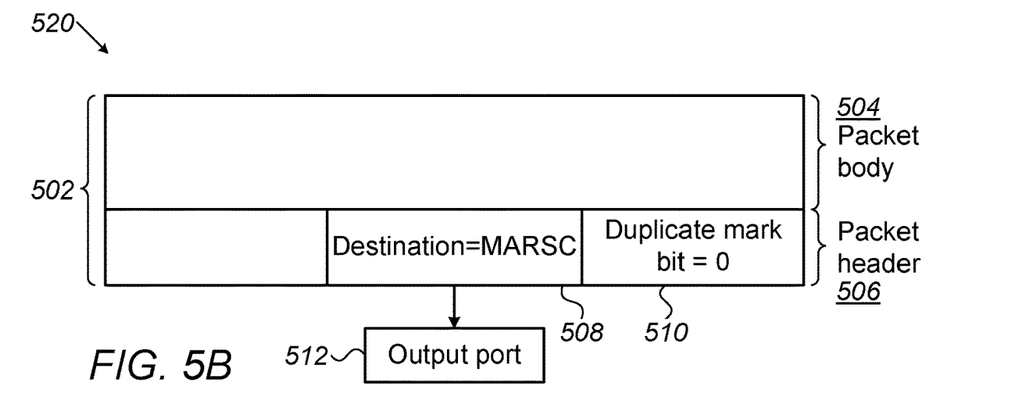
FIG. 5B is a block diagram that schematically illustrates the forwarding of a non-duplicate-marked mirror packet to a mirror agent that requires single mirror copies by a packet broker, in accordance with an embodiment of the present invention.

FIG. 5B is a block diagram that schematically illustrates the forwarding of a non-duplicate-marked mirror packet to a MARSC, by a packet broker, in accordance with an embodiment of the present invention. As illustrated in the example embodiment of FIG. 5B, if destination field 508 indicates an MARSC, but duplicate-mark bit 510 is not set, the switch will output the packet through output port 512.

Figure 5C:
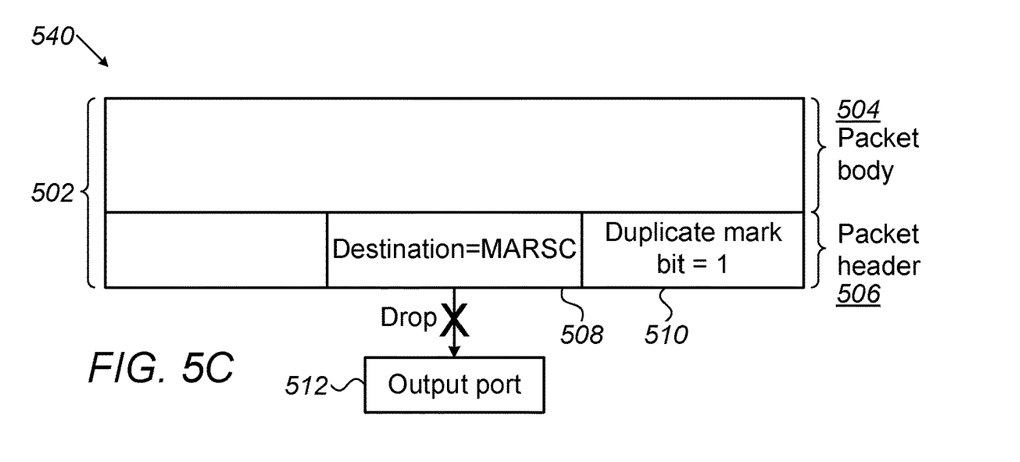
FIG. 5C is a block diagram that schematically illustrates the forwarding of a duplicate-marked mirror packet to a de-duplicating mirror agent by a packet broker, in accordance with an embodiment of the present invention.

FIG. 5C is a block diagram that schematically illustrates the forwarding of a duplicate-marked mirror packet to an MARSC by a packet broker, in accordance with an embodiment of the present invention. As illustrated in the example embodiment of FIG. 5C, if destination field 508 indicates a MARSC, and duplicate-mark bit 510 is set, the switch will not output the packet to output port 512—i.e.—the packet will be dropped.

Thus, according to the example configurations of the present invention depicted in FIGS. 5A, 5B and 5C, packet broker 122 will output all mirror packets that have a MARSC destination, and will output mirror packets that have a MARSC destination only if they are not marked as duplicate (i.e. duplicate-mark is off)

Figure 6:
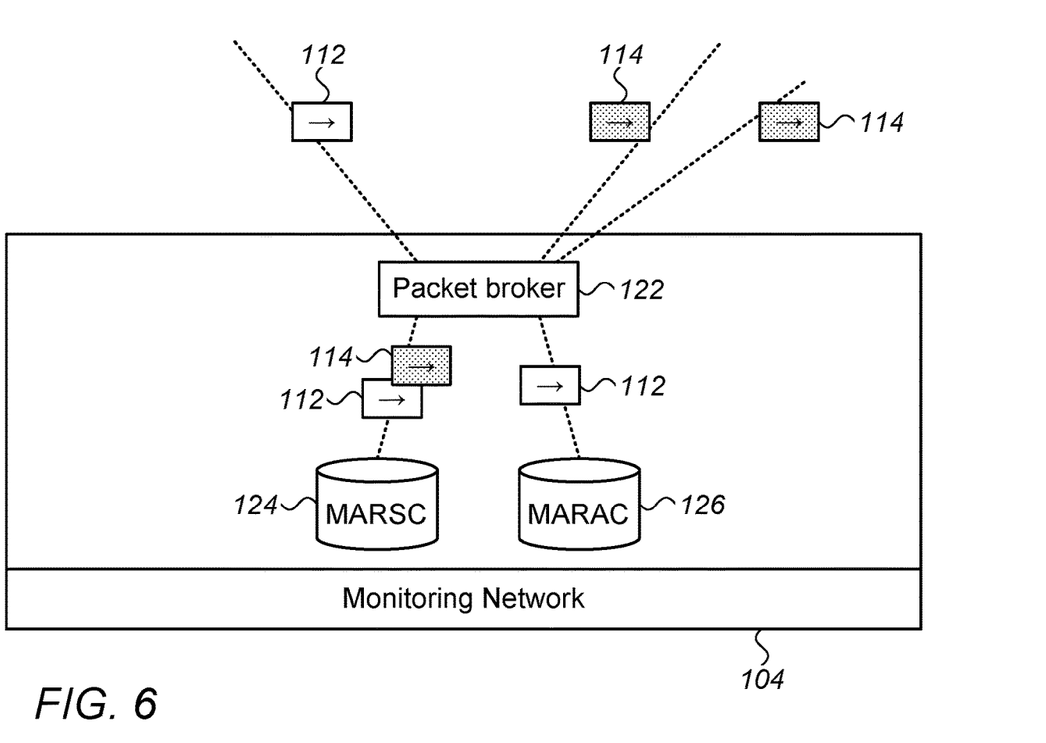
FIG. 6 is a block diagram that schematically illustrates a monitoring network when packet duplicate-marking is enabled, according to an embodiment of the present invention.

FIG. 6 is a block diagram that schematically illustrates monitoring network 104 (FIG. 1) when packet duplicate-marking is enabled, according to an embodiment of the present invention. Packet Broker 122 sends all mirror packets that the monitoring network receives to MARAC 124, and all non-duplicate-marked mirror packets to MARSC 126.

Thus, in the example embodiment of FIG. 5, MARSC 126 gets only a single copy of the mirror image, while MARAC 124 gets all copies. In embodiments, this results in simpler implementation of MARSC 126, with better performance.

As would be appreciated, monitoring network 104 described above is cited by way of example. Networks in accordance to the disclosed techniques may comprise other elements, such as network switches and/or servers. The monitoring network may be local or remote, integrated or distributed.

The configuration of network 100, including production network 102 and monitoring network 104, the configurations of packet broker 122 and the configuration of network switch 200, shown in FIGS. 1 through 6, are example configurations that are shown purely for the sake of conceptual clarity. Any other suitable configurations can be used in alternative embodiments.

The different elements of network switch 200, such as ingress pipeline 204, egress pipeline 206, Queues and Scheduling 210 (and other functions 212), may be implemented using suitable hardware, such as in one or more Application-Specific Integrated Circuits (ASICs) or Field-Programmable Gate Arrays (FPGAs), using software, using hardware, or using a combination of hardware and software elements.

In some embodiments, each network switch 200 and/or packet broker 122 comprises one or more general-purpose programmable processors, which are programmed in software to carry out the functions described herein. The software may be downloaded to the processors in electronic form, over a network, for example, or it may, alternatively or additionally, be provided and/or stored on non-transitory tangible media, such as magnetic, optical, or electronic memory.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A network switch, comprising:
multiple ports that serve as ingress ports and egress ports for connecting to a communication network; and
processing circuitry, configured to:
receive packets via the ingress ports;
select one or more of the received packets for mirroring;
create mirror copies of the selected packets, and output the created mirror copies for analysis;
mark the selected packets with mirror-duplicate indications, wherein the created mirror copy is not marked with the mirror-duplicate indication by the processing circuitry creating the mirror copy; and
forward the packets, including the packets that are marked with the mirror-duplicate indications, to the egress ports.

2. The network switch according to claim 1, wherein the processing circuitry is configured to mark the selected packets by setting a predefined bit in headers of the selected packets.

3. An apparatus, comprising:
one or more ports for receiving from a communication network mirror copies of packets for analysis, wherein the mirror copies have respective mirror-duplication indication fields and destinations;
an output interface; and
processing circuitry, configured to forward the mirror copies through the output interface, while dropping the mirror copies that both have a destination which is an analyzer that requires only a single copy of mirrored packets and have a mirror-duplication indication field which indicates a duplicate packet.

4. The apparatus according to claim 3, wherein the processing circuitry is further configured:
to forward the mirror copies that have a destination which is an analyzer that requires all mirror copies of mirrored packets, regardless of whether the mirror-duplication indication fields indicate a duplicate packet.

5. A method in a network switch that includes multiple ports serving as ingress ports and egress ports for connecting to a communication network, the method comprising:
receiving packets via the ingress ports;
selecting one or more of the received packets for mirroring;
creating mirror copies of the selected packets, and outputting the created mirror copies for analysis;
marking the selected packets with mirror-duplicate indications, wherein the created mirror copy is not marked with the mirror-duplicate indication by the processing circuitry creating the mirror copy; and
forwarding the packets, including the packets that are marked with the mirror-duplicate indications, to the egress ports.

6. The method according to claim 5, wherein marking the selected packets comprises setting a predefined bit in headers of the selected packets.

7. A method, comprising:
receiving from a communication network mirror copies of packets for analysis, wherein the mirror copies have respective mirror-duplication indication fields and destinations; and
forwarding the mirror copies, while dropping the mirror copies that both have a destination which is an analyzer that requires only a single copy of mirrored packets and have a mirror-duplication indication field which indicates a duplicate packet.

8. The method according to claim 7, further comprising forwarding the mirror copies that have a destination which is an analyzer, which utilizes all mirror copies of mirrored packets, regardless of whether the mirror-duplication indication fields indicate a duplicate packet.

* * * * *